United States Patent [19]
Lambert

[11] Patent Number: 5,345,712
[45] Date of Patent: Sep. 13, 1994

[54] MULTI PURPOSE PLANT HOLDER

[76] Inventor: Mannie S. Lambert, 6310 Havendale, Houston, Tex. 77072

[21] Appl. No.: 93,474

[22] Filed: Jul. 19, 1993

[51] Int. Cl.⁵ ............................................. A47G 7/00
[52] U.S. Cl. ................................................ 47/39; 47/87
[58] Field of Search ............................ 47/18 R, 39, 87

[56] References Cited

U.S. PATENT DOCUMENTS

| | | | |
|---|---|---|---|
| 3,542,210 | 11/1970 | Sorensen | 47/39 |
| 3,810,329 | 5/1974 | Lecuru et al. | 47/87 |
| 3,992,810 | 11/1976 | Kimball | 47/87 |

FOREIGN PATENT DOCUMENTS

| | | | |
|---|---|---|---|
| 1008820 | 4/1977 | Canada | 47/39 |
| 2236409 | 2/1975 | France | 47/39 |
| 2580458 | 10/1986 | France | 47/39 |
| 7713224 | 6/1979 | Netherlands | 47/39 |
| 94980 | 9/1959 | Norway | 47/18 |
| 930534 | 7/1963 | United Kingdom | 47/87 |
| 2074433 | 11/1981 | United Kingdom | 47/87 |

Primary Examiner—Thuy M. Bui
Assistant Examiner—Joanne C. Downs
Attorney, Agent, or Firm—James A. Bargfrede

[57] ABSTRACT

A tray having several hollow, frustro conical shaped portions for supporting pots having plants. Such tray has several openings near the edge of the tray to allow the tray to be carried while the pots having plants are positioned in the tray. A raised support is positioned in the bottom of each hollow, frustro conical shaped portions to allow the pot in each of such portions to be slightly elevated so that water can be contained and fed to each plant through the bottom of each pot holding a plant. The tray keeps the plants erect in the decorative container and acts as a filler and water reservoir. The tray is light in weight and may have many configurations.

3 Claims, 3 Drawing Sheets

MULTI PURPOSE PLANT HOLDER

BACKGROUND OF THE INVENTION

I. Field of the Invention

The present invention relates to a tray for holding pot plants.

II. Description of the Related Art

There are no known holders for small plants which act as a carrying tray, a filler, a saucer for moisture retention, and a device to keep plants erect in the decorative containers used in the horticulture industry.

SUMMARY OF THE INVENTION

The present invention relates to a holder for several pot plants. Such holder has an opening near the edge to allow the holder to be carried. Several indentations are provided for allowing pot plants to be positioned in such indentations and at the lower portion of the indentations are supports to allow space between the bottom of the indentations and the bottom of the plants so that water may be present in the bottom of such indentations to feed moisture to the pot plants. The holder of the present invention allows several pot plants to be carried at one time and also prevents the pot plants from being blown over or knocked over. Several configurations of the holder may be utilized depending upon the objective to be accomplished.

DESCRIPTION OF THE PREFERRED EMBODIMENT

Figure 1:
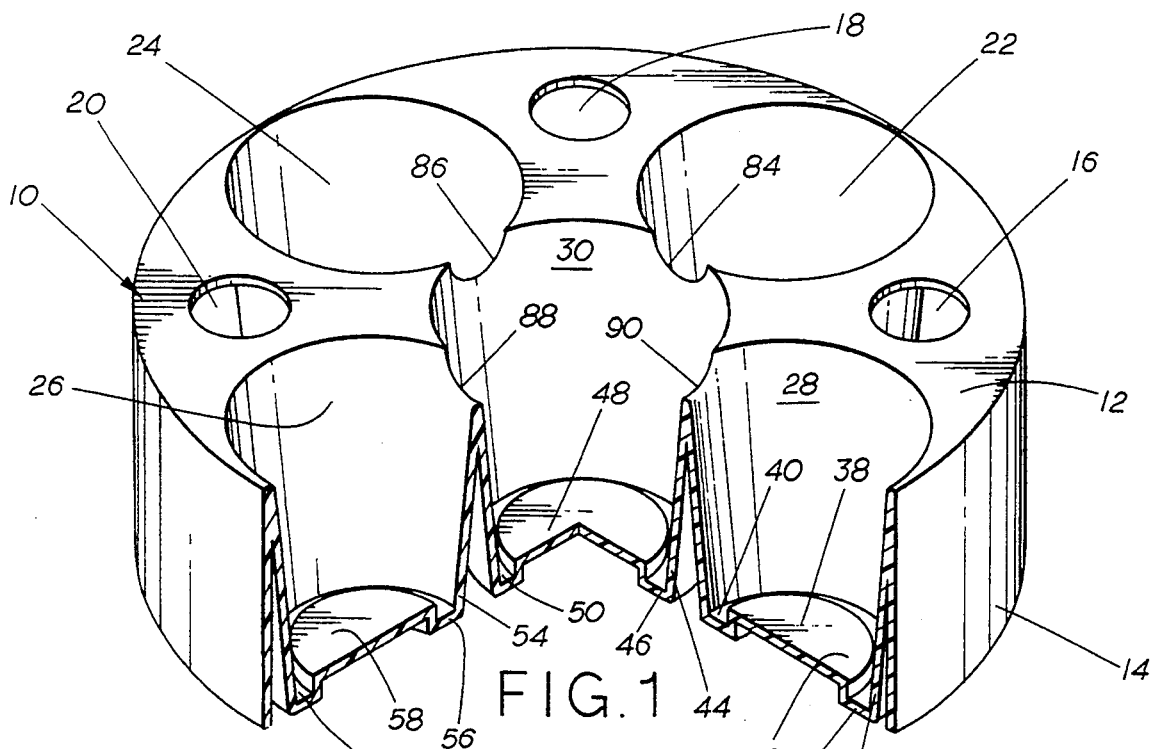
FIG. 1 is an upper, perspective, partial sectional view of a plant holder.

FIG. 1 is an upper, perspective, partial sectional view of a plant holder. Holder 10 has a planar surface 12 with an extension 14 substantially perpendicular to planar surface 12.

Holder 10 may be constructed of plastic or other suitable light weight yet sturdy material.

A plurality of openings such as openings 16, 18 and 20 are provided in the planar surface 12 to allow human fingers to be positioned for lifting or moving the holder 10.

A plurality of hollow, frustro conical shaped portions such as portion 22, portion 24, portion 26, portion 28 and portion 30 extend from the planar surface 12 to allow pot plants to be positioned in these portions. It will be appreciated that the hollow, frustro conical shaped portions 22, 24, 26, 28, and 30 are molded into the planar surface 12 with each portion having a side member such as side member 32 of hollow, frustro conical shaped portion 28. A bottom 36 has a raised support 38 to allow the pot plant to rest on such raised support 38 thereby allowing space 40 to accumulate water or, if desired, air circulation to the bottom of the pot plant positioned in portion 28. Each of the hollow, frustro conical shaped portions 22, 24, 26, and 30 have a structure similar to that described in connection with hollow, frustro conical shaped portion 28.

Portion 30 has a side member 44 and a bottom 46 Raised support 48 provides space 50.

Hollow, frustro conical shaped portion 26 has a side member 54 and a bottom 56. Raised support 58 provides space 60.

Curved recesses 84, 86, 88, and 90 allow fingers to grasp the pot plants when positioning such pot plants.

Thus it will be appreciated in viewing FIG. 1 that a plurality of pot plants may be positioned in the hollow, frustro conical shaped portions to allow such pot plants to be carried or moved from one location to another and also keeps such pot plant from being blown over or knocked over.

Figure 2:
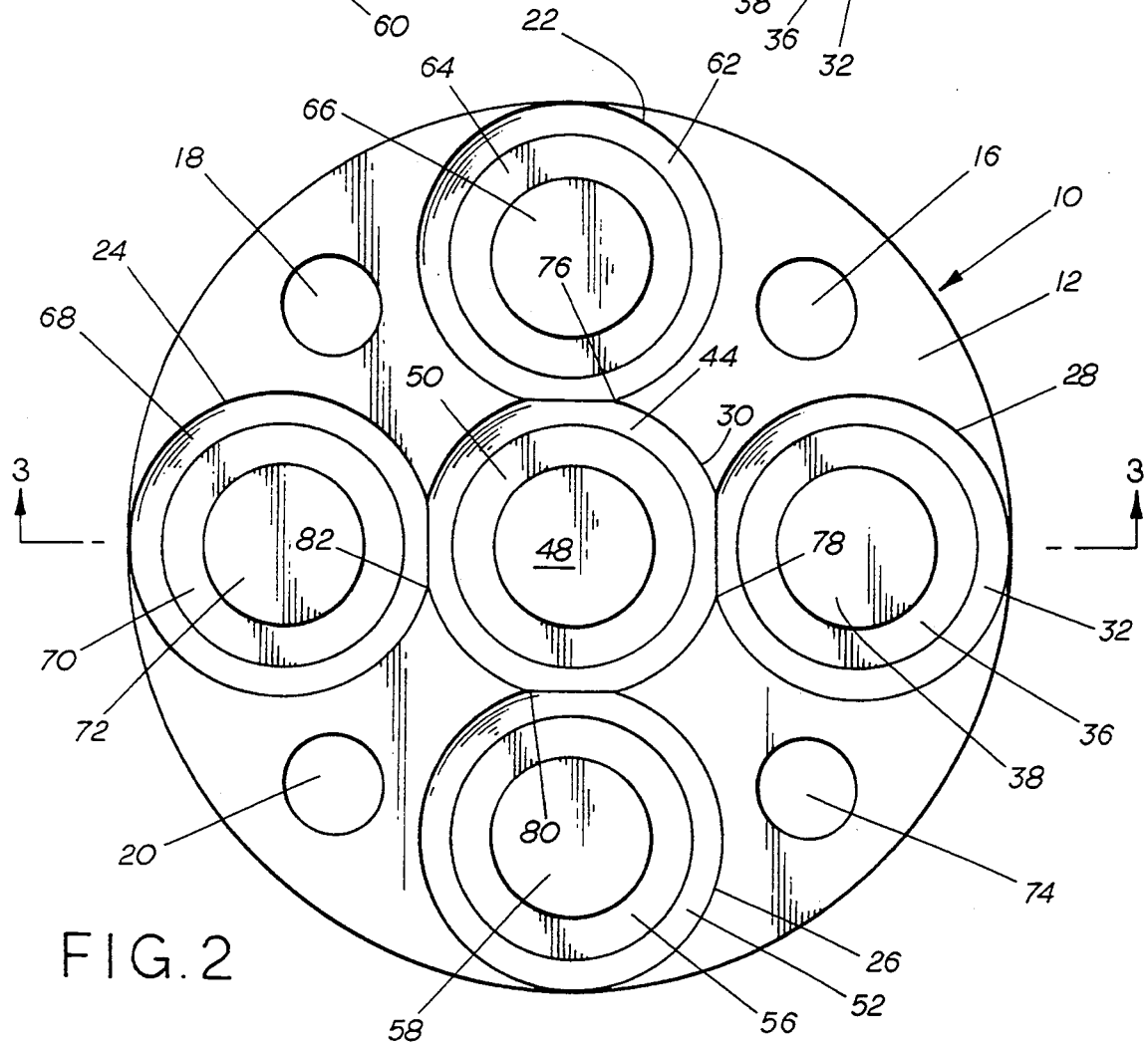
FIG. 2 is a top, plan view of the plant holder shown in FIG. 1.

FIG. 2 is a top, plan view of the plant holder shown in FIG. 1. Hollow, frustro conical shaped portion 22 has a side member 62, bottom 64, and raised support 66 as explained in connection with portion 28 and 30 of FIG. 1 as well as portion 26 of FIG. 1. Portion 24 includes side member 68, bottom 70 and raised support 72.

Opening 74 in FIG. 2 was not visible in FIG. 1 but it will be appreciated that opening 74 serves the same purpose as opening 16, 18 and 20 as explained previously.

It will be appreciated in viewing FIG. 2 that portion 22 is joined to portion 30 at overlap 76, portion 28 is joined to portion 30 at overlap 78, portion 26 is joined to portion 30 at overlap 80, and portion 30 is joined to portion 24 at overlap 82. By allowing the portions to overlap, stability is provided to the holder 10 and allows pot plants to be positioned in the holder 10 with greater ease.

Figure 3:
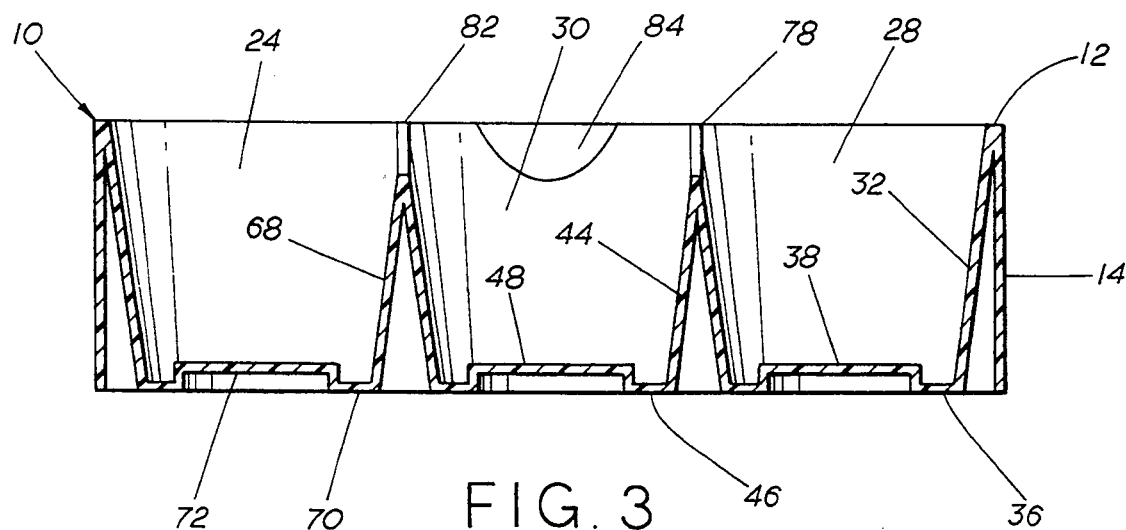
FIG. 3 is a sectional, elevational view of the plant holder taken along line 3—3 of FIG. 2.

FIG. 3 is a sectional, elevational view of the plant holder taken along line 3—3 of FIG. 2. Holder 10 has a planar portion 12 and extension 14. Extension 14 extends around the edge or periphery of the planar surface 12.

Portion 28 has side member 32 extending to bottom 36 with raised support 38 being positioned on bottom 36.

Portion 30 has side member 44 extending to the bottom 46 with raised support 48 extending from bottom 46.

Portion 24 has side member 68 extending to bottom 70 with raised support 72 extending above bottom 70.

As pointed out previously, the raised supports allow the pot plants to be elevated from the bottom to allow water and air to enter the pot plants.

Overlap 82 is between portion 24 and portion 30 and overlap 78 is between portion 30 and portion 28.

A curved recess 84 is shown in FIG. 3 and allows fingers to grasp the pot plants when positioning such pot plants in the holder and when removing such pot plants from the holder.

Figure 4:
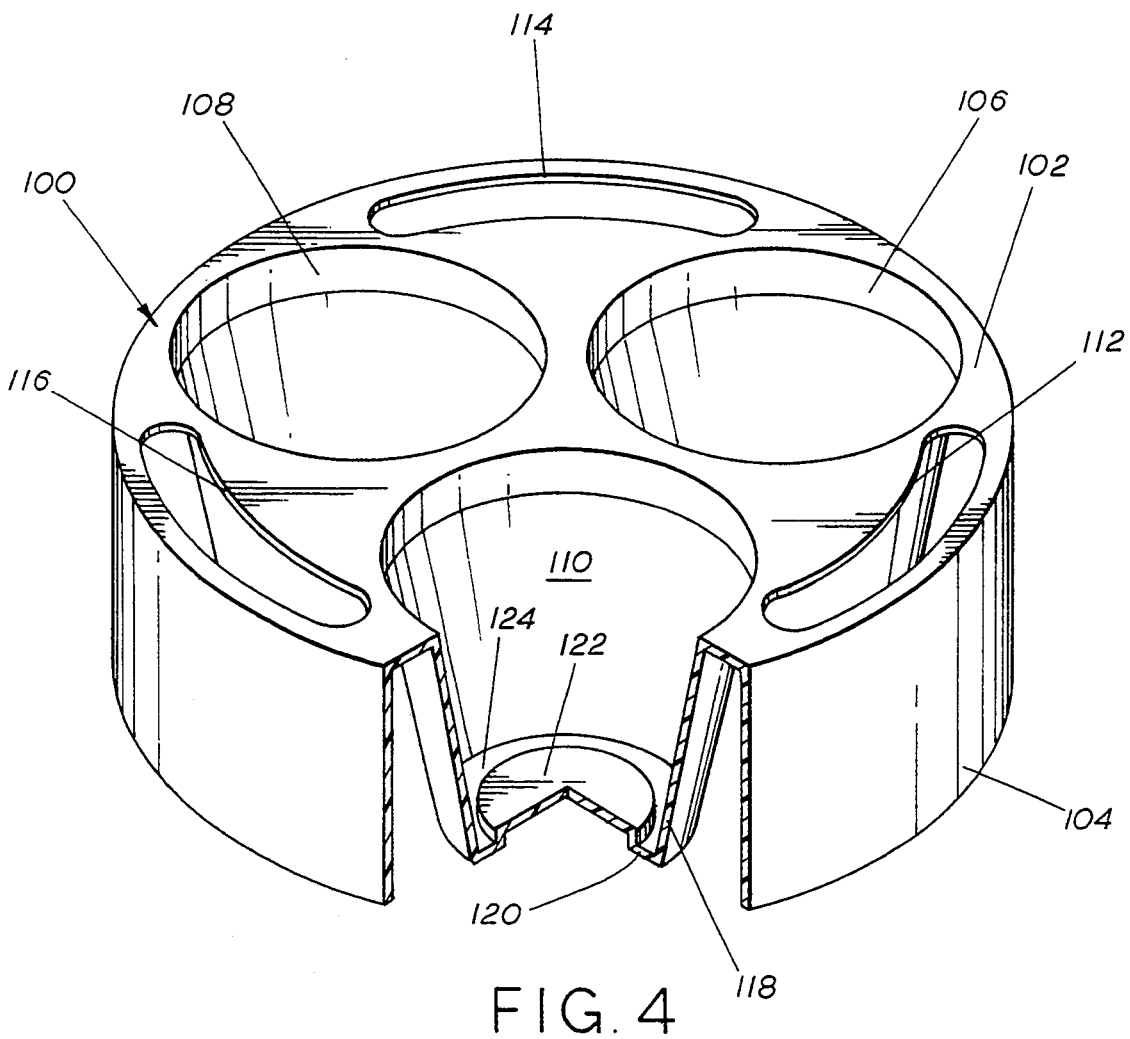
FIG. 4 is an upper, perspective, partial sectional view of another plant holder.

FIG. 4 is an upper, perspective, partial sectional view of another plant holder. Holder 100 has a planar surface 102 from which extension 104 is attached. Extension 104 is at substantially 90 degrees from planar surface 102. A hollow, frustro conical shaped portion 106, 108, and 110 are positioned in the planar surface 102.

Near the edge of the planar surface 102 and near extension 104 are elongated, curved openings 112, 114, and 116.

Portion 110 has a side member 118, a bottom 120, and a raised support 122. Space 124 allows water to accumulate in the portion 110 to feed a pot plant in portion 110 or to allow air to circulate into the pot plant positioned in portion 110.

The elongated, curved openings 112, 114, and 116 allow fingers of hands to be positioned in such openings to lift or move the holder 100.

Figure 5:
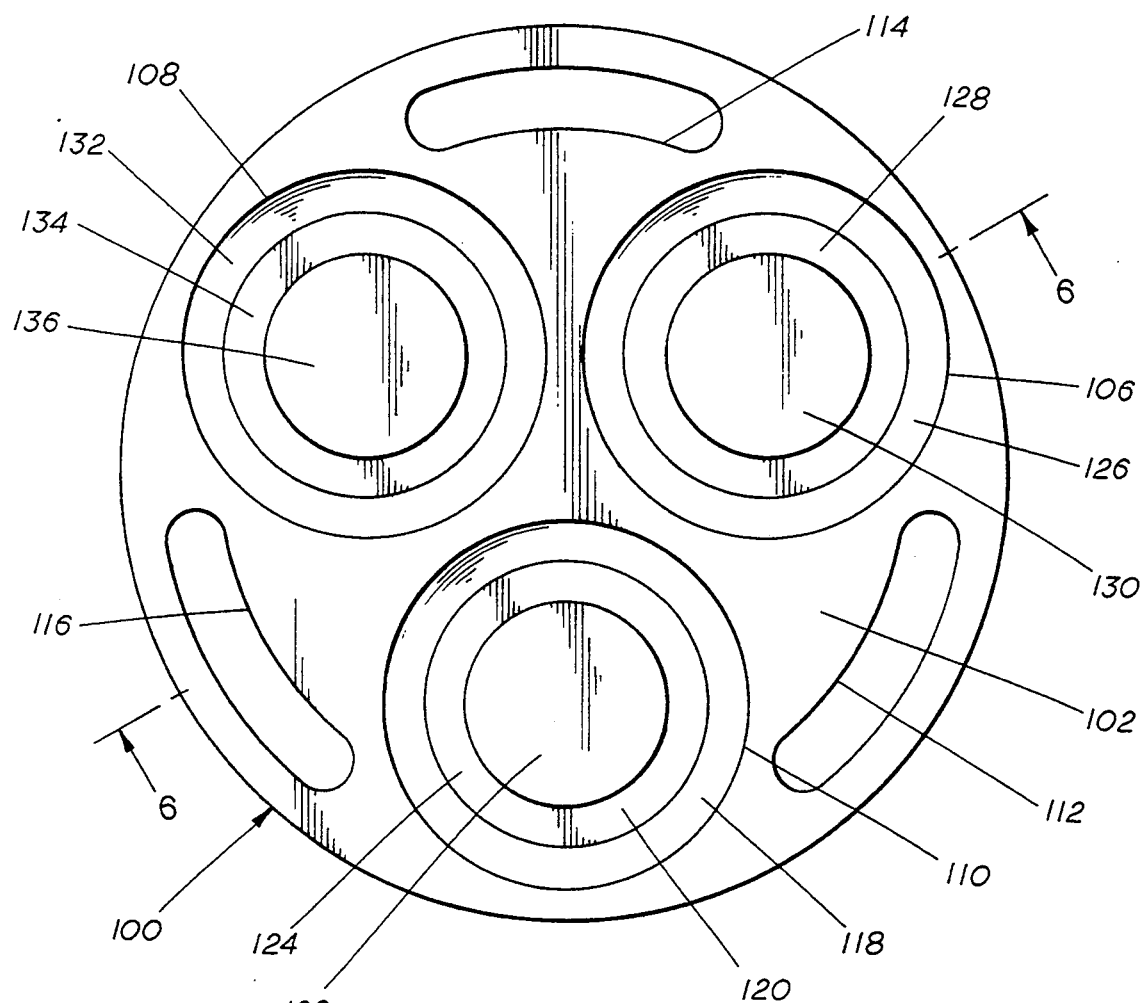
FIG. 5 is a top, plan view of the plant holder shown in FIG. 4.

FIG. 5 is a top, plan view of the plant holder shown in FIG. 4. Hollow, frustro conical shape portion 106 has a side member 126 and a bottom 128. Raised support 130 is on bottom 128.

Portion 108 has side member 132, bottom 134, and raised support 136.

As explained in connection with FIG. 4 portion 110 has side member 118, bottom 120 and raised support 122. Space 124 is between bottom 120 and raised support 122. (We need to add the space numerals for portions 106 and 108.)

Elongated, curved openings 112, 114 and 116 allow fingers of hands to be positioned in the holder 100 to move holder 100.

Figure 6:
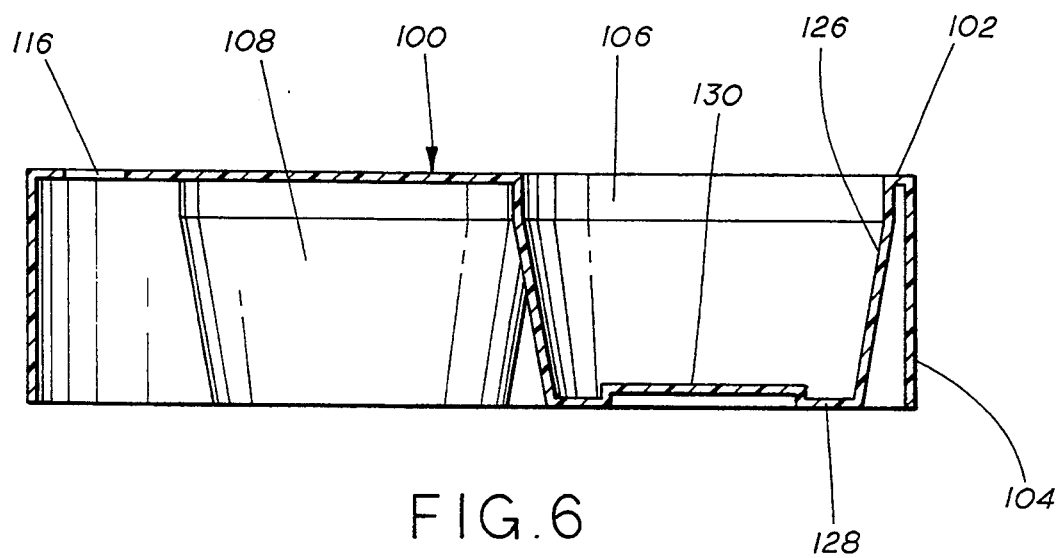
FIG. 6 is a sectional, elevational view of the plant holder taken along 6—6 of FIG. 5.

FIG. 6 is a sectional, elevational view of the plant holder taken along line 6—6 of FIG. 5. Holder 100 includes planar surface 102 and extension 104. Hollow, frustro conical shaped portion 106 has side member 126, bottom 128 and raised support 130.

Hollow, frustro conical shaped portion 108 is shown in FIG. 6 also.

Thus, it will be appreciated that the plant holder of the present invention is versatile in use and provides stability to pot plants while also allowing such pot plants to be moved to desired locations with minimum effort and acts as a filler and saucer for water reservoir inside a decorative container. The plant holder of the present invention is light in weight, sturdy, and relatively inexpensive to build. The unitary construction also is an important added feature.

Although a preferred embodiment of the invention has been shown and described in accordance with the requirements of the United States Patent Laws, it will be appreciated by those skilled in the art to which the present invention pertains that modifications and improvements may be made without departing from the spirit of the invention defined by the following claims.

I claim:

1. An article of manufacture including in combination
   a planar member including a substantially perpendicular extension along the perimeter,
   a plurality of openings near the perimeter of said planar member,
   a plurality of hollow, frustro conical portions positioned in said planar member with a large end of said portions being joined to said planar member and a small end of said portions having a bottom support, and
   at least one raised support positioned near the center of each bottom support of said plurality of hollow, frustro conical portions.

2. An article of manufacture defined by claim 1 and further including a plurality of pot plants each positioned in one of said plurality of hollow, frustro conical portions.

3. An article of manufacture defined by claim 1 wherein said plurality of hollow, frustro conical portions partially overlap at the large end of said portions.

* * * * *